United States Patent
Brown et al.

(10) Patent No.: US 8,248,541 B2
(45) Date of Patent: Aug. 21, 2012

(54) PHASED LOCKED RESONANT SCANNING DISPLAY PROJECTION

(75) Inventors: Margaret K. Brown, Seattle, WA (US); Robert James Jackson, Monroe, WA (US); Mark Champion, Kenmore, WA (US)

(73) Assignee: Microvision, Inc., Redmond, WA (US)

(*) Notice: Subject to any disclaimer, the term of this patent is extended or adjusted under 35 U.S.C. 154(b) by 588 days.

(21) Appl. No.: 12/496,892

(22) Filed: Jul. 2, 2009

(65) Prior Publication Data

US 2011/0001888 A1 Jan. 6, 2011

(51) Int. Cl.
*H04N 9/31* (2006.01)
(52) U.S. Cl. ............... 348/744; 359/200.8; 455/556.1
(58) Field of Classification Search ............ 348/744; 359/200.8, 212.1, 213.1, 214.1, 223.1–226.1; 455/556.1; 345/545
See application file for complete search history.

(56) References Cited

U.S. PATENT DOCUMENTS

| | | | | |
|---|---|---|---|---|
| 5,451,425 A * | 9/1995 | Vig | ............................... | 438/322 |
| 5,526,255 A * | 6/1996 | Shenk | ............................. | 700/56 |
| 5,579,148 A * | 11/1996 | Nishikawa et al. | ......... | 359/214.1 |
| 5,774,626 A * | 6/1998 | Shenk | ........................... | 388/815 |
| 6,285,489 B1 * | 9/2001 | Helsel et al. | .................. | 359/291 |
| 6,522,395 B1 * | 2/2003 | Bamji et al. | ................. | 356/5.01 |
| 6,575,278 B1 * | 6/2003 | Schumann et al. | ............. | 192/19 |
| 6,924,476 B2 * | 8/2005 | Wine et al. | .................... | 250/235 |
| 7,002,716 B2 * | 2/2006 | Wine et al. | ................. | 359/204.4 |
| 7,071,594 B1 * | 7/2006 | Yan et al. | ...................... | 310/309 |
| 7,126,733 B2 * | 10/2006 | Kandori et al. | ............ | 359/196.1 |
| 7,746,515 B2 * | 6/2010 | Straka et al. | .................. | 358/474 |

FOREIGN PATENT DOCUMENTS

| KR | 10-2007-0012650 | 1/2007 |
|---|---|---|
| WO | WO-96-07268 | 3/1996 |

* cited by examiner

*Primary Examiner* — Annan Shang
(74) *Attorney, Agent, or Firm* — Kevin D. Wills (57) ABSTRACT

A scanning projector includes a mirror that scans in two dimensions. The scanning mirror oscillates at a resonant frequency on a fast-scan axis, and is phase locked to an incoming frame rate on a slow-scan axis. An interpolation component interpolates pixel intensity data from adjacent pixels based on the position of the mirror when a pixel clock arrives. Incoming video data is stored in a buffer. Less than a complete frame of video data may be stored in the buffer.

20 Claims, 7 Drawing Sheets

PHASED LOCKED RESONANT SCANNING DISPLAY PROJECTION

FIELD

The present invention relates generally to display devices, and more specifically to scanning display devices.

BACKGROUND

Some display devices create an image by scanning a beam of varying intensity across a display surface. For example, some projection display devices scan a light beam across a surface in a row and column pattern. The rate at which the light beam scans is typically not related to the rate at which display data is supplied to the projection display device.

Some projection display devices include frame buffers in the form of solid state memory to store data to be displayed. The frame buffer allows storage of display data arriving at various rates to be retrieved at different rates as dictated by the scanning rate of the projection display device. Although frame buffers provide a necessary function in some display devices, they can consume significant resources on integrated circuits. For example, a VGA (640×480) display with 24 bits per pixel uses 640×480×24=over seven million bits of storage. Resources consumed by frame buffers increase as the display resolution increases.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
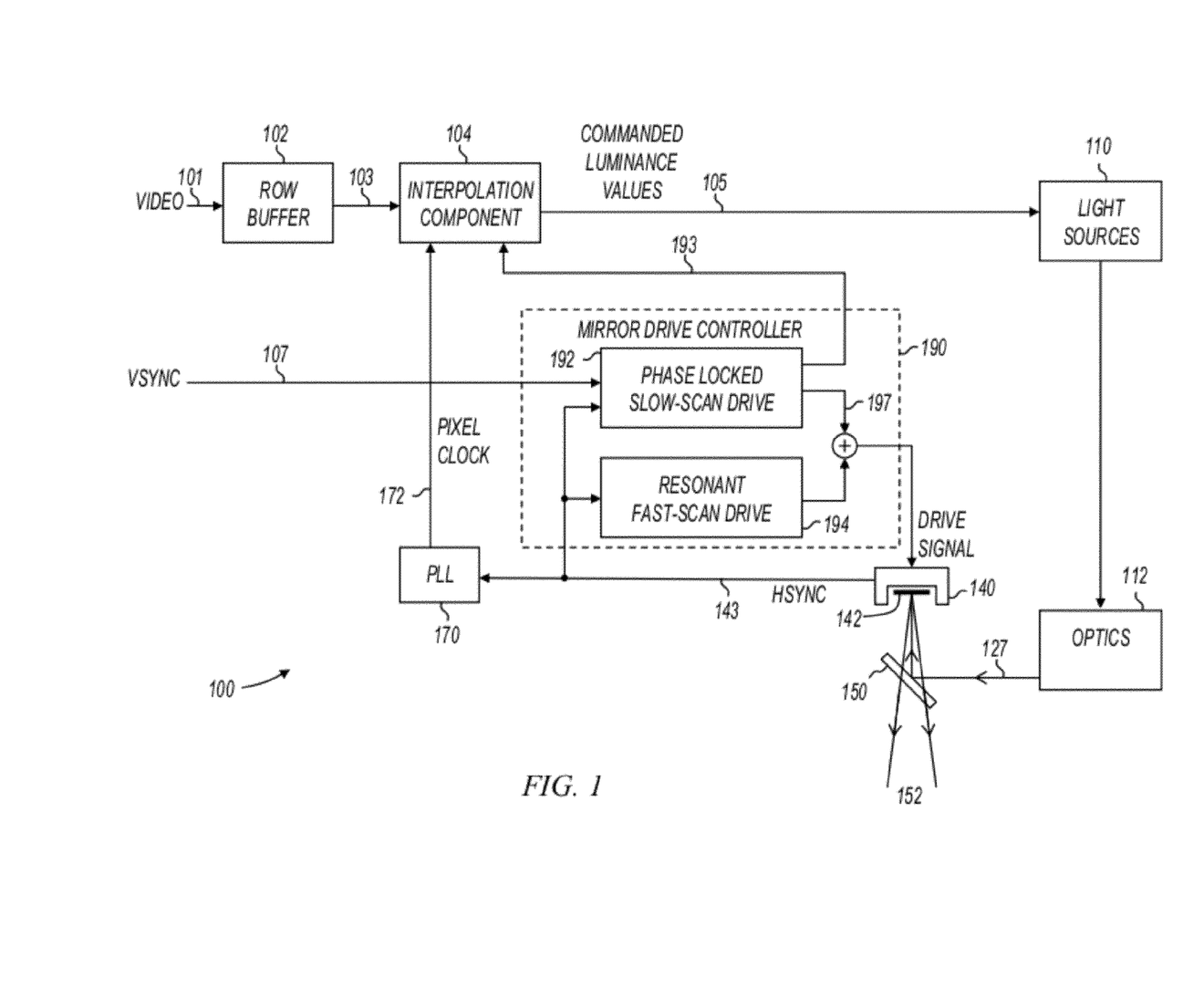
FIG. 1 shows a scanning projection system with a phase locked slow-scan and a resonant fast-scan.

FIG. 1 shows a scanning projection system with a phase locked slow-scan and a resonant fast-scan. Projection system 100 includes row buffer 102, interpolation component 104, light sources 110, optics 112, filter/polarizer 150, microelectromechanical machine (MEMS) device 140 having mirror 142, digital phase lock loop (PLL) 170, and mirror drive controller 190.

In operation, scanning projection system 100 receives video data on node 101 and a vertical sync (VSYNC) signal on node 107. The video data represents pixel intensity for one or more colors per pixel. For example, in a three color system having eight bits representing each color, each pixel may be represented by 24 bits (e.g., eight bits each for red, green, and blue). The remainder of this description refers to a three color system (red, green, and blue); however, the various embodiments of the invention are not so limited. Any number of colors (including one) may be utilized without departing from the scope of the present invention.

In some embodiments, the video data arrives row by row. For example, the first video data received may correspond to an upper left pixel in an image. Succeeding video data represents the remainder of the pixels in the top row from left to right, and then further rows from top to bottom. When the bottom right of the image is reached, then a complete "frame" of video data has been supplied. The rate at which frames of video data are received is referred to herein as the "frame rate." The vertical sync (VSYNC) signal is asserted once per frame. Accordingly, VSYNC is periodic at the frame rate.

Row buffer 102 stores one or more rows of video data, and provides the video data to interpolation component 104 as needed. Interpolation component 104 interpolates between pixels at times specified by the pixel clock on node 172, and produces commanded luminance values at 105 to drive light sources 110 when pixels are to be displayed.

The commanded luminance values are converted to light by light sources 110. In some embodiments, light sources 110 include laser light sources. For example, in some embodiments light sources 110 include laser diodes to produce red, green, and blue laser light. In these embodiments, light sources 110 may also include luminance to current (L/I) lookup tables and digital-to-analog converters (DACs). Light sources 110 are not limited to lasers. For example, other light sources, such as color filters or light emitting diodes (LEDs) or edge-emitting LEDs, could easily be substituted.

Optics 112 receive red, green, and blue light from light sources 110. Optics 112 may include any suitable optical components such as dichroic mirrors, lenses, prisms, or the like, to combine and/or focus the light at 127. The light at 127 is reflected off filter/polarizer 150 and is directed at MEMS mirror 142.

The MEMS mirror 142 rotates on two axes (a "fast-scan" axis and a "slow-scan" axis) in response to electrical stimuli shown as "DRIVE SIGNAL" provided by mirror drive controller 190. In operation, mirror drive controller 190 provides signals to MEMS device 140 to cause a beam to scan a trajectory to paint a display image. MEMS mirror 142 oscillates on the fast-scan axis at a resonant frequency. For example, in some embodiments, MEMS mirror 142 is designed to have a mechanical resonance at 18 kHz. Also for example, in some embodiments, MEMS mirror 142 is designed to have a mechanical resonance at 24.5 kHz. In still further embodiments, MEMS mirror 142 is designed to have a mechanical resonance at 27 kHz. As described herein, the fast-scan axis of MEMS mirror 142 is oriented to scan across rows of the displayed image, although this is not a limitation of the present invention.

The rate at which MEMS mirror 142 moves on the slow-scan axis is programmable. In various embodiments of the present invention, movement of MEMS mirror 142 on the slow-scan axis is phase locked to the VSYNC signal such that the slow-scan frequency closely matches the frame rate of the video source. By matching the slow-scan frequency to the incoming frame rate, the scanning projector can operate without a complete frame buffer. Rather than a frame buffer, the various embodiments of the present invention include row buffer 102 sized to hold less than a full frame of video data. The row buffer can be made very small depending on the loop bandwidth of the system. For example, if the loop is tightly locked with a very small error, the row buffer may be only a few rows, or even be nonexistent.

The minimum resonant frequency of the MEMS mirror for distortion-free operation is a function of the incoming video frame rate and the number of rows in the incoming video. As long as the MEMS mirror can paint a number of lines equal to or greater than the number of rows in the incoming video, then the MEMS mirror does not introduce distortion resulting from an inadequate fast-scan rate. As a specific example, and not by way of limitation, assume the incoming video has 480 lines and the scanning projector is able to paint pixels left-to-right and right-to-left. In this example, 240 fast-scan cycles are needed to paint the image. Further assume a 20% overhead for flyback time as well as front porch and back porch at the top and bottom of the image. Table 1 shows minimum MEMS mirror resonant frequencies for frame rates of 60 Hz, 70 Hz, 72 Hz, and 85 Hz, under the above assumptions.

TABLE 1

| Fast-Scan cycles to paint image (480 rows) | 20% Overhead | Frame Rate | Min Fast-Scan Rate |
| --- | --- | --- | --- |
| 480/2 = 240 | 1.2 | 60 Hz | 240 × 1.2 × 60 = 17.3 kHz |
| 480/2 = 240 | 1.2 | 72 Hz | 240 × 1.2 × 72 = 20.8 kHz |
| 480/2 = 240 | 1.2 | 75 Hz | 240 × 1.2 × 75 = 21.6 kHz |
| 480/2 = 240 | 1.2 | 85 Hz | 240 × 1.2 × 85 = 24.5 kHz |

The mechanical resonance of the MEMS mirror may be any value higher than the minimum shown. For example, if a 24.5 KHz fast-scan MEMS mirror is operated with a 60 Hz frame rate, then vertical oversampling results. This results in more than 480 rows being painted in the image. In some embodiments, the MEMS mirror may be resonant at 27 kHz or higher.

MEMS device 140 includes one or more position sensors to sense the position of mirror 142. For example, in some embodiments, MEMS device 140 includes a piezoresistive sensor that delivers a voltage that is proportional to the deflection of the mirror on the fast-scan axis. Further, in some embodiments, MEMS device 140 includes an additional piezoresistive sensor that delivers a voltage that is proportional to the deflection of the mirror on the slow-scan axis. In other embodiments, the position information at 143 may be in the form of one or more digital sync signals. The horizontal sync (HSYNC) sync signal shown in FIG. 1 may be produced directly by a position sensor or may be produced from a sinusoidal position signal.

Mirror drive controller 190 includes phase locked slow-scan drive 192 and resonant fast-scan drive 194. Output signals from phase locked slow-scan drive 192 and resonant fast-scan drive 194 are summed to produce the drive signal to MEMS device 140.

Resonant fast-scan drive 194 provides periodic excitations to cause MEMS mirror 142 to oscillate at the mechanical resonant frequency on the fast-scan axis. Resonant fast scan drive 194 receives the HSYNC signal on node 143 as a feedback signal. Resonant fast scan drive 194 includes a control circuit that may alter the timing or amplitude of its output signal as a function of the HSYNC signal.

Phase locked slow-scan drive 192 provides a control signal on node 197 to cause MEMS mirror 142 to sweep on the slow-scan axis. The control signal on node 197 works in combination with the mirror dynamics to result in the desired mirror movement on the slow-scan axis. Phase locked slow-scan drive 192 also provides a control signal on node 193 that corresponds to the commanded mirror position on the slow-scan axis at any point in time. Phase locked slow-scan drive 192 receives the incoming video VSYNC and the HSYNC from MEMS device 140. Phase locked slow-scan drive 192 phase locks the control signal on node 197 to the incoming VSYNC to lock the slow-scan sweep of MEMS mirror 142 to the incoming video frame rate. Example embodiments of phase locked slow-scan drive 192 are discussed below with reference to FIG. 3.

The HSYNC signal on node 143 is also provided to PLL 170. PLL 170 includes at least one loop circuit to produce a pixel clock at 172. In some embodiments, the pixel clock is generated to produce pixel clock edges that are periodic in space as the mirror sweeps the light beam on the fast-scan axis. In these embodiments, the pixel clock is not periodic in time. Further, in these embodiments, interpolation component 104 may only perform interpolation in the slow-scan dimension (between pixel data in different rows). In other embodiments, the pixel clock is generated to produce pixel clock edges that are periodic in time. In these embodiments, the pixel clock is not periodic in space as the mirror sweeps the light beam on the fast-scan axis. Further, in these embodiments, interpolation component 104 may perform interpolation in both the slow-scan dimension (between pixel data in different rows) and the fast-scan dimension (between pixel data in the same row).

Interpolation component 104 receives the commanded slow-scan mirror position at 193, the pixel clock at 172, and pixel data at 103 from row buffer 102. Interpolation component 104 uses the commanded slow-scan mirror position to determine which pixels are to be displayed at each pixel clock. When the pixel clock does not correspond to the location of an existing pixel in the row buffer, interpolation component 104 interpolates between neighboring pixel data to determine the commanded luminance values.

The various components shown in FIG. 1 may be implemented in many ways. For example, image processing component 102 may be implemented in dedicated hardware, software or any combination. When operating at slower speeds, software implementations may be fast enough to satisfy display rate requirements. When operating at high speeds, a dedicated hardware implementation may be required to satisfy display rate requirements.

Figure 2:
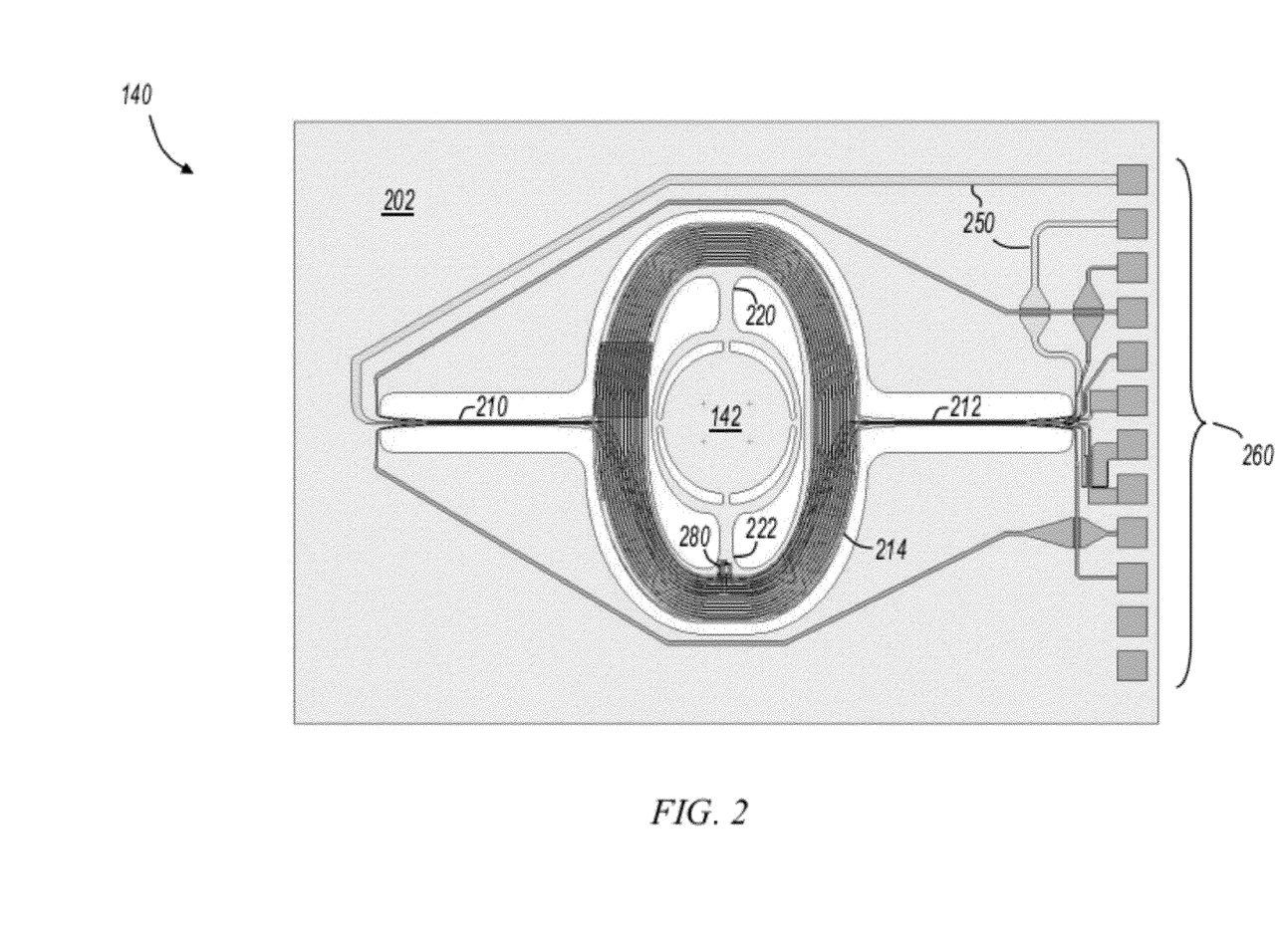
FIG. 2 shows a plan view of a microelectromechanical system (MEMS) device with a scanning mirror.

FIG. 2 shows a plan view of a microelectromechanical system (MEMS) device with a scanning mirror. MEMS device 140 includes fixed platform 202, scanning platform 214 and scanning mirror 142. Scanning platform 214 is coupled to fixed platform 202 by flexures 210 and 212. Flexures 210 and 212 form the slow-scan axis. Scanning mirror 142 is coupled to scanning platform 214 by flexures 220 and 222. Flexures 220 and 222 form the fast-scan axis. Scanning platform 214 has a drive coil connected to drive lines 250. Current driven into drive lines 250 produces a current in the drive coil. MEMS device 140 also incorporates one or more integrated piezoresistive position sensors. Piezoresistive sensors 280 produce a voltage that represents the displacement of mirror 142 with respect to scanning platform 214 (the fast-scan axis). In some embodiments, MEMS device 140 includes one position sensor for each axis. Two of the interconnects 260 are coupled to drive lines 250. The remaining interconnects provide for the integrated position sensors for each axis.

In operation, an external magnetic field source (not shown) imposes a magnetic field on the drive coil. The magnetic field imposed on the drive coil by the external magnetic field source has a component in the plane of the coil, and is oriented non-orthogonally with respect to the two drive axes. The in-plane current in the coil windings interacts with the in-plane magnetic field to produce out-of-plane Lorentz forces on the conductors. Since the drive current forms a loop on scanning platform 214, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

Scanning platform 214 moves relative to fixed platform 202 in response to the torque. Flexures 210, 212, 220 and 222 are torsional members that twist as scanning platform 214 undergoes an angular displacement with respect to fixed platform 202. In the various embodiments of the present invention, scanning platform 214 is commanded to sweep back and forth at the frame rate of incoming video. Scanning mirror 142 also moves relative to scanning platform 214 in response to the torque, although scanning mirror moves on the fast-scan axis at a resonant frequency.

The long axis of flexures 210 and 212 form a pivot axis. Flexures 210 and 212 are flexible members that undergo a torsional flexure, thereby allowing scanning platform 214 to rotate on the pivot axis and have an angular displacement relative to fixed platform 202. Flexures 210 and 212 are not limited to torsional embodiments as shown in FIG. 2. For example, in some embodiments, flexures 210 and 212 take on other shapes such as arcs, "S" shapes, or other serpentine shapes. The term "flexure" as used herein refers to any flexible member coupling a scanning platform to another platform (scanning or fixed), and capable of movement that allows the scanning platform to have an angular displacement with respect to the other platform.

The particular MEMS device embodiment shown in FIG. 2 is provided as an example, and the various embodiments of the invention are not limited to this specific implementation. For example, any scanning mirror capable of resonant operation on the fast-scan axis and phase locked operation on the slow-scan axis may be incorporated without departing from the scope of the present invention. In some embodiments, a capacitive comb drive mirror is employed. Also for example, multiple scanning mirrors may be utilized without departing from the scope of the present invention. A first mirror may move on a first axis phase locked to an incoming video frame rate, and a second mirror may oscillate on a second axis at a resonant frequency.

Figure 3:
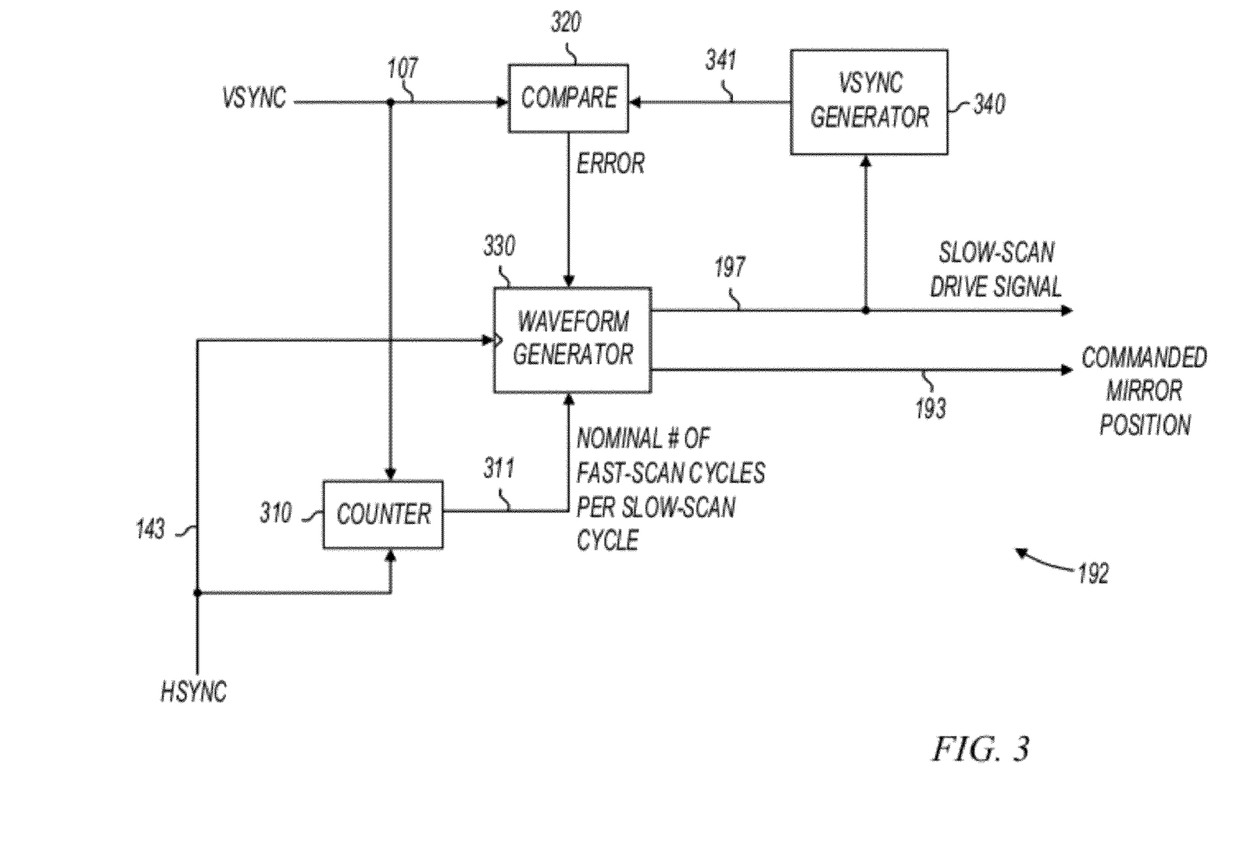
FIG. 3 shows a phase locked slow-scan drive controller in accordance with various embodiments of the invention.

FIG. 3 shows a phase locked slow-scan drive controller in accordance with various embodiments of the present invention. Phase locked slow-scan controller 192 includes waveform generator 330 to generate the slow-scan drive signal on node 197 and the commanded mirror position signal on node 193. Waveform generator 330 may be implemented by any suitable means. For example, in some embodiments, waveform generator 330 may include one or more memories and digital-to-analog converters (DAC). The memories may be programmed with values that correspond to points on the desired waveforms, and the DACs may receive the values in the memories and produce the slow-scan drive signal and commanded mirror position signal. In other embodiments, waveform generator 330 generates sawtooth waveforms using Taylor series coefficients and inverse fast Fourier transforms (IFFT).

Phase locked slow-scan drive controller 192 also includes counter 310, comparator 320 and VSYNC generator 340. Counter 310 counts the number of HSYNCs on node 143 for each VSYNC on node 107. This determines the nominal number of fast-scan cycles of the MEMS mirror for each incoming video frame. VSYNC generator 340 creates a VSYNC signal on node 341 from the slow-scan drive signal, and comparator 320 compares the timing of the incoming video VSYNC on node 107 and the slow-scan drive signal VSYNC on node 341. Comparator 320 provides an error signal to waveform generator 330 to close the loop. Waveform generator 330 adjusts the slow-scan drive signal to reduce the error.

Waveform generator 330 is shown being clocked by HSYNC on node 143. In some embodiments, waveform generator 330 is clocked by the pixel clock on node 172 (FIG. 1).

At startup, when the VSYNC signal is first detected on node 107, counter 310 determines the nominal number of resonant fast-scan cycles per incoming video frame. Waveform generator 330 is then programmed to produce a slow-scan drive signal with this number of fast-scan cycles per incoming video frame.

During operation, the slow-scan drive signal is altered as necessary to phase-lock the slow-scan drive signal to the incoming video frame rate. In some embodiments, the slow-scan drive signal is modified only by modifying the flyback time such that the number of fast-scan cycles per active video frame remains constant. In other embodiments, the slow-scan drive signal is modified by altering an integer number or non-integer number of fast-scan cycles in the video frame. In these embodiments, pixel locations within each frame may change, but interpolation component 104 (FIG. 1) still determines the correct data to be displayed at each pixel clock.

In another embodiment, the vertical blanking interval is modified by an integer number of fast-scan cycles as necessary to phase lock the slow-scan drive signal to the incoming video frame rate. In these embodiments, one or more fast-scan cycles may be inserted or removed in the vertical blanking period as necessary to maintain synchronization between the internal slow-scan drive and the external vertical sync.

The various components shown in FIG. 3 may be implemented in any suitable fashion. For example, in some embodiments, all of the components shown in FIG. 3 are implemented in digital and analog hardware components. Also for example, in some embodiments, the components of FIG. 3 are implemented in a combination of digital hardware and software, and analog components. For example, a microprocessor may receive the nominal number of fast-scan cycles per incoming video frame, perform the comparison at 320, and program waveform generator 330.

Figure 4:
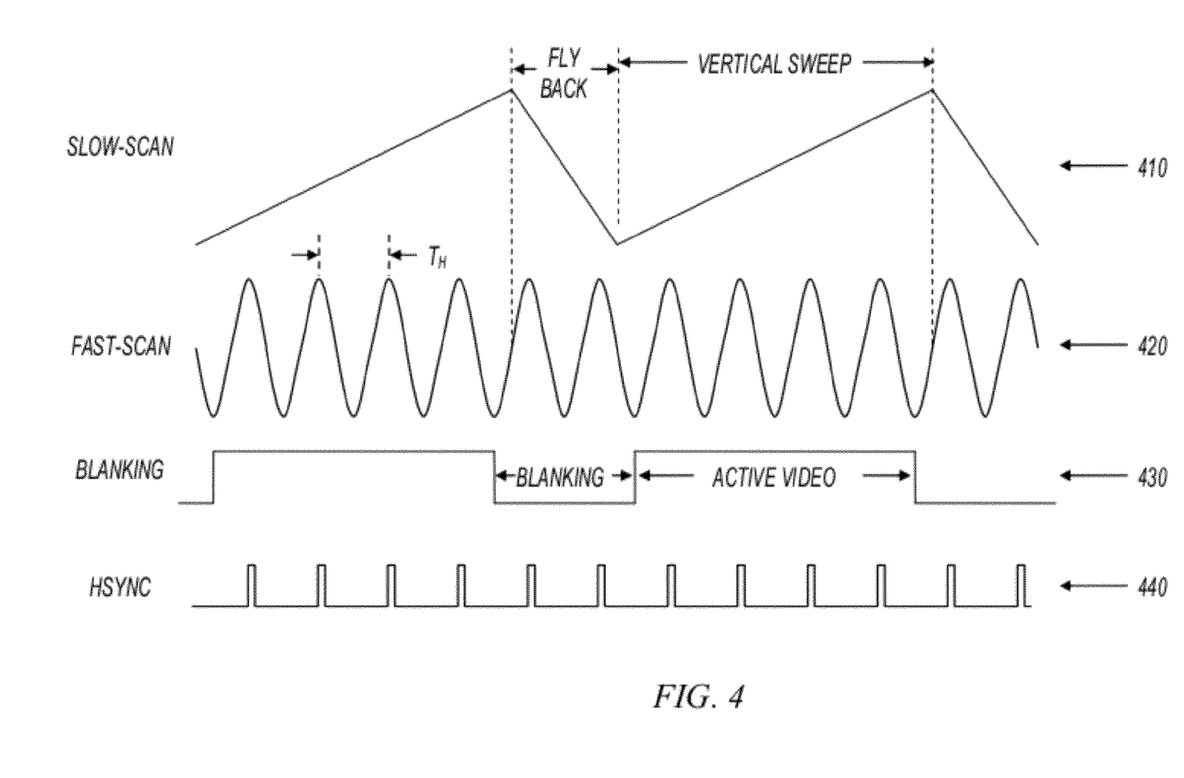
FIG. 4 shows example waveforms suitable for the operation of the projection system of FIG. 1.

FIG. 4 shows example waveforms suitable for the operation of the projection system of FIG. 1. Slow-scan deflection waveform 410 is a sawtooth waveform, and fast-scan deflection waveform 420 is a sinusoidal waveform having period $T_H$. When mirror 142 is deflected on its slow-scan and fast-scan axes according to the waveforms 410 and 420, the scanned beam trajectory shown in FIG. 5 results.

Deflection of mirror 142 according to waveforms 410 and 420 may be achieved by driving MEMS device 140 with the appropriate drive signals. In some embodiments, the fast-scan deflection frequency is at a resonant frequency of the mirror and a very small excitation at that frequency will result in the desired deflection. A sawtooth drive signal for the slow-scan deflection may be derived from a sum of sine waves at various frequencies. The drive signal for the slow-scan deflection may also be derived from specific points programmed into a waveform generator such as waveform generator 330 (FIG. 3).

Sawtooth slow-scan deflection waveform 410 includes vertical sweep portions and flyback portions. In some embodiments, pixels are displayed during the vertical sweep portions, and not during the flyback portions. The flyback portions correspond to the beam "flying back" to the top of the image field of view. Blanking waveform 480 is also shown in FIG. 4. The scanned beam is blanked (no pixels are displayed) during flyback, and is not blanked during the vertical sweep.

Vertical sync (VSYNC) signal 402 is also shown in FIG. 4. VSYNC is the incoming video VSYNC that arrives once per video frame. In accordance with various embodiments of the invention, the slow-scan drive control portion of the mirror drive controller (FIG. 1) receives VSYNC and modifies the slow-scan drive signal such that the period of the slow-scan deflection waveform 410 is phase locked to VSYNC. In some embodiments, only the flyback time is modified. In some embodiments, the flyback time is modified by an integer number of periods $T_H$. In other embodiments, the flyback time is modified by a non-integer number of periods $T_H$. In still further embodiments, the vertical sweep time and/or the flyback time is modified. Any part of the slow-scan drive signal may be modified during the phase locking process without departing from the scope of the present invention.

Horizontal sync (HSYNC) signal 440 is also shown in FIG. 4. HSYNC signal 440 corresponds to the mirror position signal at 143 (FIG. 1). HSYNC is a digital signal that has one rising edge per period of the fast-scan deflection waveform. HSYNC may be produced by passing the fast-scan deflection waveform through a level detector. The fast-scan deflection according to waveform 420 is measured by the position sensor(s) on the MEMS device 142, so HSYNC has the same period as the fast-scan deflection, $T_H$.

For clarity of explanation, FIG. 4 shows only a few fast-scan cycles per frame. In practice, many more fast-scan cycles are present. For example, a fast-scan resonant frequency of 24.5 kHz and a frame rate of 60 Hz will yield about 408 fast-scan cycles per frame.

Figure 5:
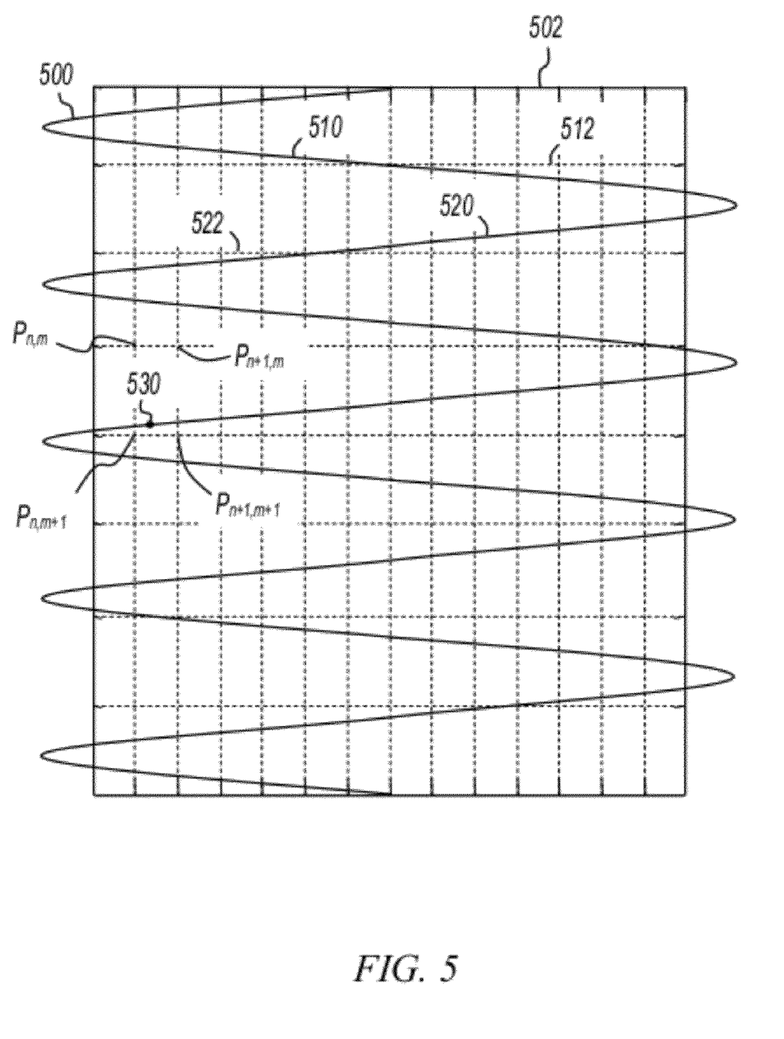
FIG. 5 shows a scan trajectory resulting in the waveforms of FIG. 4.

FIG. 5 shows a scan trajectory having a sinusoidal horizontal fast-scan component and a non-sinusoidal slow-scan vertical component. Scan trajectory 500 corresponds to the slow-scan mirror deflection and fast-scan mirror deflection shown in FIG. 4. Scan trajectory 500 is shown superimposed upon a grid 502. Grid 502 represents rows and columns of pixels that make up a display image. The rows of pixels are aligned with the horizontal dashed lines, and columns of pixels are aligned with the vertical dashed lines. The image is made up of pixels that occur at the intersections of dashed lines. On scan trajectory 500, the beam sweeps back and forth left to right in a sinusoidal pattern, and sweeps vertically at a constant rate. In some embodiments, the trajectory sweeps up quickly during a "flyback" and pixels are not displayed on the retrace.

As described above with reference to FIG. 1, the projection system that produces scan trajectory 500 includes a scanning mirror that oscillates on the fast axis at a resonant frequency and that has a slow-scan deflection phase locked to the incoming video frame rate. This combination of slow-scan and fast-scan deflection patterns results in displayed pixels that do not necessarily correspond in position to the pixels in grid 502. For example, a pixel clock edge may occur at point 530 which lies below pixel $P_m$ and above pixel $P_{m+1}$ in row n of grid 502. In some embodiments, the projection system may interpolate pixel intensity values in one dimension. For example, the projection system may interpolate pixel intensity values between $P_{n,m}$ and $P_{n,m+1}$, and display the resulting pixel intensity at point 530.

As an example, interpolation component 104 (FIG. 1) interpolates between $P_{n,m}$ and $P_{n,m+1}$ to determine the new pixel intensity $P_{new}$ as $$P_{new} = (1-b)P_n + bP_{n+1} \qquad (1)$$

where b is the fractional row distance from row m to the pixel location of $P_{new}$.

In other embodiments, the projection system may interpolate pixel intensity values in two dimensions. For example, the projection system may interpolate pixel intensity values between $P_{n,m}$, $P_{n+1,m}$, $P_{n,m+1}$, and $P_{n+1,m+1}$, and display the resulting pixel intensity at point 531.

As an example, interpolation component 104 (FIG. 1) may interpolate between $P_{n,m}$, $P_{n+1,m}$, $P_{n,m+1}$, and $P_{n+1,m+1}$ to determine the new pixel intensity $P_{new}$ as $$P_{new} = (1-a)(1-b)P_{n,m} + a(1-b)P_{n+1,m} + (1-a)bP_{n,m+1} + abP_{n+1,m+1} \qquad (2)$$

where b is the fractional row distance from row m to the pixel location of $P_{new}$, and a is the fractional column distance from column n to the pixel location of $P_{new}$.

In operation, row buffer 102 (FIG. 1) holds only as many rows of pixel data as necessary to accommodate interpolation. Prior to each horizontal sweep, the row buffer is updated to only hold the necessary video data. For example, newly arriving video data is stored in the row buffer, and older video corresponding to rows of pixel data that have already been traversed in the image may be discarded. Size and power are saved because a complete frame buffer is not required.

Figure 6:
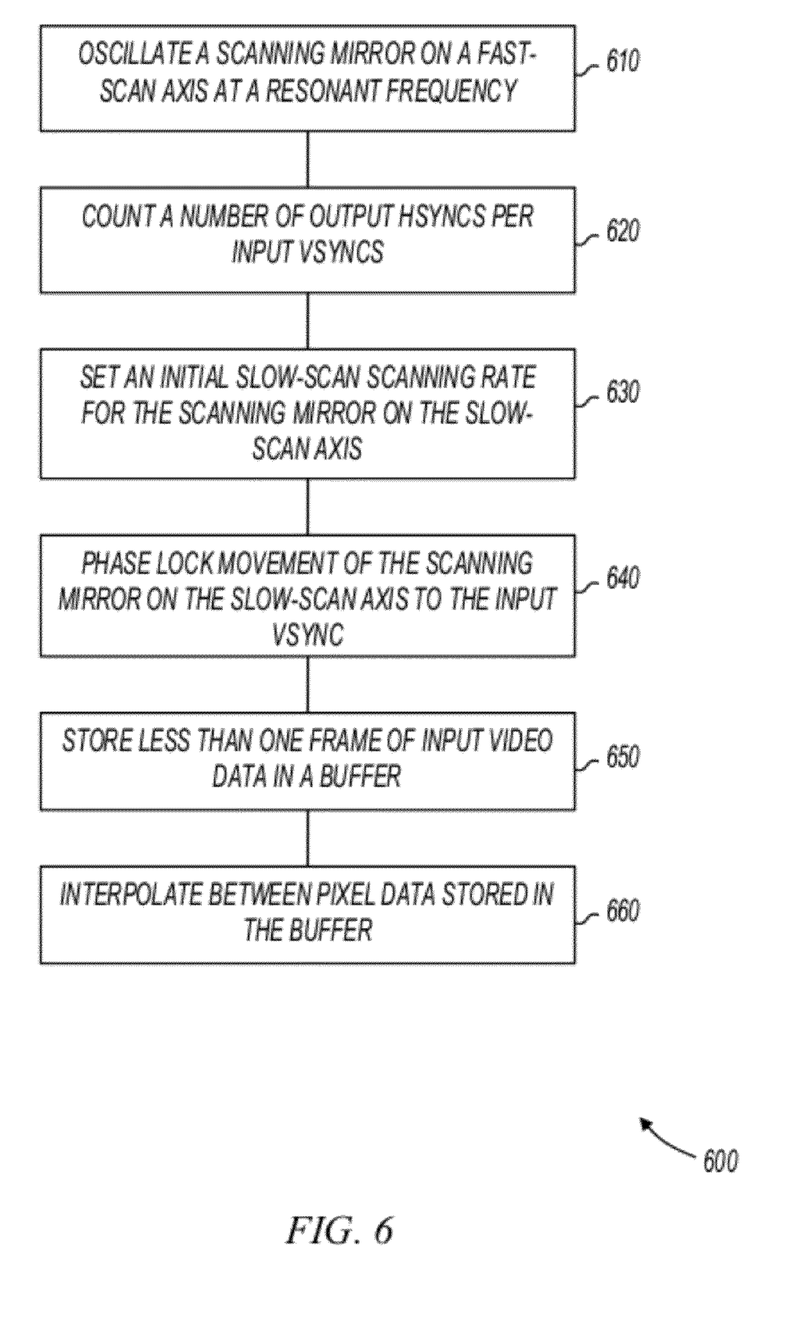
FIG. 6 shows a flowchart in accordance with various embodiments of the present invention.

FIG. 6 shows a flowchart in accordance with various embodiments of the present invention. In some embodiments, method 600, or portions thereof, is performed by a raster scanning projector with a phase-locked slow-scan trajectory and a resonant fast-scan trajectory, embodiments of which are shown in previous figures. In other embodiments, method 600 is performed by an integrated circuit or an electronic system. Method 600 is not limited by the particular type of apparatus performing the method. The various actions in method 600 may be performed in the order presented, or may be performed in a different order. Further, in some embodiments, some actions listed in FIG. 6 are omitted from method 600.

Method 600 is shown beginning with block 610 in which a scanning mirror oscillates on a fast scan axis at a resonant frequency. In various embodiments of the invention, this corresponds to exciting MEMS mirror 142 with a periodic signal at the mechanical resonant frequency of the mirror.

At 620, a number of output HSYNCs is counted per input VSYNC. This corresponds to the operation of counter 310 (FIG. 3). The output HSYNCs correspond to cycles on the fast-scan axis. The number of output HSYNCs per input VSYNC corresponds to the number of fast-scan cycles per incoming video frame.

At 630, an initial slow-scan scanning rate is set for the scanning mirror on the slow-scan axis. This corresponds to programming waveform generator 330 to sweep the slow-scan trajectory at an initial rate that is close to the frame rate of the incoming video.

At 640, the movement of the scanning mirror on the slow-scan axis is phase locked to the input VSYNC. This phase locks the slow-scan refresh rate to the incoming video frame rate.

At 650, less than one frame of input video data is stored in a buffer. This corresponds to the operation of row buffer 102 (FIG. 1). Because the slow-scan sweep is phase locked to the incoming video frame rate, less than a full frame of data may be stored. This is true even though the number of fast-scan sweeps may not equal the number of rows in the video data.

At 660, pixel data stored in the buffer is interpolated. In some embodiments, pixel data is interpolated in only the fast-scan or slow-scan dimension, and in other embodiments, pixel data is interpolated in both the slow-scan and fast-scan dimensions.

Figure 7:
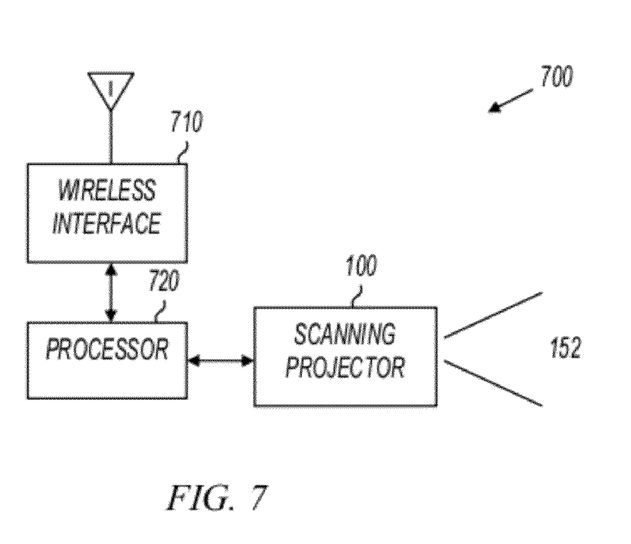
FIG. 7 shows a block diagram of a mobile device in accordance with various embodiments of the present invention.

FIG. 7 shows a block diagram of a mobile device in accordance with various embodiments of the present invention. As shown in FIG. 7, mobile device 700 includes wireless interface 710, processor 720, and scanning projector 100. Scanning projector 100 paints a raster image at 152. Scanning projector 100 is described with reference to FIG. 1. In some embodiments, scanning projector 100 includes a scanning mirror that oscillates at a resonant frequency on one axis and is phase locked to incoming video on another axis.

Scanning projector 100 may receive image data from any image source. For example, in some embodiments, scanning projector 100 includes memory that holds still images. In other embodiments, scanning projector 100 includes memory that includes video images. In still further embodiments, scanning projector 100 displays imagery received from external sources such as connectors, wireless interface 710, or the like.

Wireless interface 710 may include any wireless transmission and/or reception capabilities. For example, in some embodiments, wireless interface 710 includes a network interface card (NIC) capable of communicating over a wireless network. Also for example, in some embodiments, wireless interface 710 may include cellular telephone capabilities. In still further embodiments, wireless interface 710 may include a global positioning system (GPS) receiver. One skilled in the art will understand that wireless interface 710 may include any type of wireless communications capability without departing from the scope of the present invention.

Processor 720 may be any type of processor capable of communicating with the various components in mobile device 700. For example, processor 720 may be an embedded processor available from application specific integrated circuit (ASIC) vendors, or may be a commercially available microprocessor. In some embodiments, processor 720 provides image or video data to scanning projector 100. The image or video data may be retrieved from wireless interface 710 or may be derived from data retrieved from wireless interface 710. For example, through processor 720, scanning projector 100 may display images or video received directly from wireless interface 710. Also for example, processor 720 may provide overlays to add to images and/or video received from wireless interface 710, or may alter stored imagery based on data received from wireless interface 710 (e.g., modifying a map display in GPS embodiments in which wireless interface 710 provides location coordinates).

Figure 8:
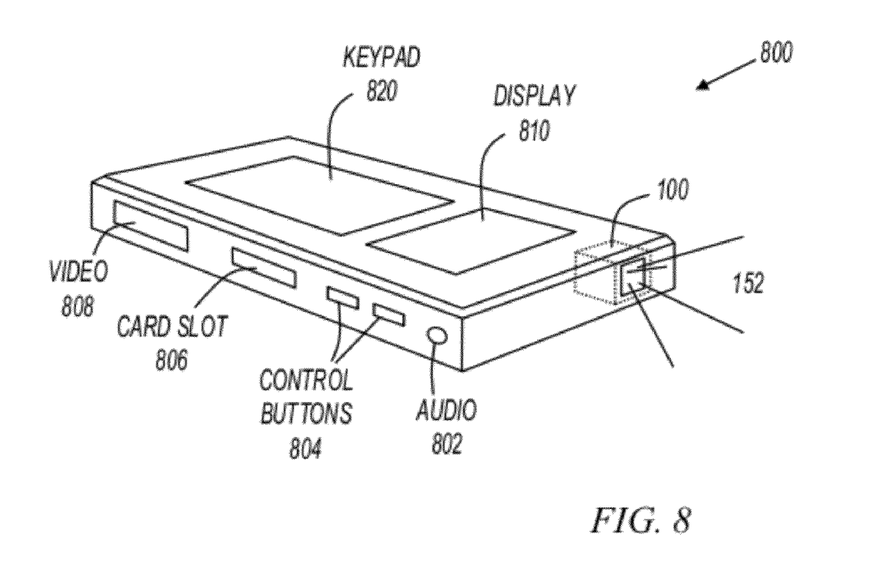
FIG. 8 shows a mobile device in accordance with various embodiments of the present invention.

FIG. 8 shows a mobile device in accordance with various embodiments of the present invention. Mobile device 800 may be a hand held projection device with or without communications ability. For example, in some embodiments, mobile device 800 may be a handheld projector with little or no other capabilities. Also for example, in some embodiments, mobile device 800 may be a device usable for communications, including for example, a cellular phone, a smart phone, a personal digital assistant (PDA), a global positioning system (GPS) receiver, or the like. Further, mobile device 800 may be connected to a larger network via a wireless (e.g., WiMax) or cellular connection, or this device can accept data messages or video content via an unregulated spectrum (e.g., WiFi) connection.

Mobile device 800 includes scanning projector 100 to create an image with light at 152. Mobile device 800 also includes many other types of circuitry; however, they are intentionally omitted from FIG. 8 for clarity.

Mobile device 800 includes display 810, keypad 820, audio port 802, control buttons 804, card slot 806, and audio/video (A/V) port 808. None of these elements are essential. For example, mobile device 800 may only include scanning projector 100 without any of display 810, keypad 820, audio port 802, control buttons 804, card slot 806, or A/V port 808. Some embodiments include a subset of these elements. For example, an accessory projector product may include scanning projector 100, control buttons 804 and A/V port 808.

Display 810 may be any type of display. For example, in some embodiments, display 810 includes a liquid crystal display (LCD) screen. Display 810 may always display the same content projected at 152 or different content. For example, an accessory projector product may always display the same content, whereas a mobile phone embodiment may project one type of content at 152 while display different content on display 810. Keypad 820 may be a phone keypad or any other type of keypad.

A/V port 808 accepts and/or transmits video and/or audio signals. For example, A/V port 808 may be a digital port that accepts a cable suitable to carry digital audio and video data. Further, A/V port 808 may include RCA jacks to accept composite inputs. Still further, A/V port 808 may include a VGA connector to accept analog video signals. In some embodiments, mobile device 800 may be tethered to an external signal source through A/V port 808, and mobile device 800 may project content accepted through A/V port 808. In other embodiments, mobile device 800 may be an originator of content, and A/V port 808 is used to transmit content to a different device.

Audio port 802 provides audio signals. For example, in some embodiments, mobile device 800 is a media player that can store and play audio and video. In these embodiments, the video may be projected at 152 and the audio may be output at audio port 802. In other embodiments, mobile device 800 may be an accessory projector that receives audio and video at A/V port 808. In these embodiments, mobile device 800 may project the video content at 152, and output the audio content at audio port 802.

Mobile device 800 also includes card slot 806. In some embodiments, a memory card inserted in card slot 806 may provide a source for audio to be output at audio port 802 and/or video data to be projected at 152. Card slot 806 may receive any type of solid state memory device, including for example, Multimedia Memory Cards (MMCs), Memory Stick DUOs, secure digital (SD) memory cards, and Smart Media cards. The foregoing list is meant to be exemplary, and not exhaustive.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. An apparatus comprising:
   a scanning mirror capable of angular movement on two axes, the two axes including a slow-scan axis a fast-scan axis; and
   a control system to excite the scanning mirror to move on the fast-scan axis at a resonant frequency of the scanning mirror, and to move on the slow-scan axis on a trajectory phase locked to an input video frame rate;
   wherein the control system is coupled to receive an external vertical sync (VSYNC) signal from a video source and an internal horizontal sync (HSYNC) signal from the scanning mirror.

2. The apparatus of claim 1 wherein the control system includes a counting mechanism to count a number of internal HSYNCs for each external VSYNC.

3. The apparatus of claim 2 wherein the control system is operative to set an initial slow-scan rate in response to the number of internal HSYNCs for each external VSYNC.

4. The apparatus of claim 1 wherein the control system is operative to compare an external vertical sync (VSYNC) with a generated slow-scan drive signal, and to modify the slow-scan drive signal in response thereto.

5. The apparatus of claim 1 further comprising a video buffer to hold less than a complete frame of video data.

6. The apparatus of claim 5 further comprising an interpolation component to interpolate between rows of pixel data held in the buffer.

7. The apparatus of claim 5 further comprising an interpolation component to interpolate between columns of pixel data held in the buffer.

8. The apparatus of claim 7 wherein the interpolation component interpolates between rows and columns of pixel data held in the buffer.

9. A method of operating a scanning projection system comprising:
   oscillating a scanning mirror on a fast-scan axis at a resonant frequency;
   phase locking movement of the scanning mirror on a slow-scan axis to an input vertical sync (VSYNC) signal;
   counting a number of output horizontal sync (HSYNC) signals produced by the scanning mirror oscillating on the fast-scan axis per input (VSYNC) signals; and setting an initial vertical scanning rate of the scanning mirror on the slow-scan axis.

10. The method of claim 9 wherein phase locking comprises modifying a cycle time of the scanning mirror on the slow-scan axis by an integer number of cycles at the resonant frequency.

11. The method of claim 10 further comprising storing less than one frame of input video data in a buffer.

12. The method of claim 11 further comprising interpolating between pixel data in adjacent rows (vertical interpolation) of the buffer.

13. The method of claim 11 further comprising interpolating between pixel data in adjacent columns (horizontal interpolation) of the buffer.

14. The method of claim 9 wherein phase locking comprises modifying a cycle time of the scanning mirror on the slow-scan axis by a non-integer number of cycles at the resonant frequency.

15. The method of claim 9 further comprising storing less than one frame of input video data in a buffer.

16. The method of claim 15 further comprising interpolating between pixel data in adjacent rows (vertical interpolation) and between pixel data in adjacent columns (horizontal interpolation) of the buffer.

17. A mobile device comprising:
   a video source to source video data and a vertical sync (VSYNC) signal; and
   a projection device coupled to the video source comprising a scanning mirror capable of angular movement on two axes, the two axes including a slow-scan axis and a fast-scan axis, and a control system to excite the scanning mirror to move on the fast-scan axis at a resonant frequency of the scanning mirror, and to move on the slow-scan axis on a trajectory phase locked to the VSYNC signal.

18. The mobile device of claim 17 wherein the video source comprises a video input port.

19. The mobile device of claim 17 wherein the control system is operative to compare the VSYNC with a generated slow-scan drive signal, and to modify the slow-scan drive signal in response thereto.

20. The mobile device of claim 17 further comprising a cellular telephone radio transceiver.

* * * * *